United States Patent
Li et al.

(10) Patent No.: US 9,897,769 B2
(45) Date of Patent: Feb. 20, 2018

(54) VISION-BASED PASSIVE ALIGNMENT OF AN OPTICAL FIBER SUBASSEMBLY TO AN OPTOELECTRONIC DEVICE

(71) Applicant: NANOPRECISION PRODUCTS, INC., El Segundo, CA (US)

(72) Inventors: Shuhe Li, Pasadena, CA (US); Gregory L. Klotz, La Verne, CA (US); Michael K. Barnoski, Pacific Palisades, CA (US); Robert Ryan Vallance, Newbury Park, CA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 0 days.

(21) Appl. No.: 14/721,990

(22) Filed: May 26, 2015

(65) Prior Publication Data

US 2015/0338585 A1 Nov. 26, 2015

Related U.S. Application Data

(60) Provisional application No. 62/002,772, filed on May 23, 2014.

(51) Int. Cl.
*G02B 6/42* (2006.01)

(52) U.S. Cl.
CPC .......... *G02B 6/423* (2013.01); *G02B 6/4214* (2013.01); *G02B 6/4224* (2013.01); *G02B 6/4245* (2013.01); *G02B 6/4257* (2013.01); *G02B 6/4243* (2013.01); *G02B 6/4249* (2013.01); *Y10T 29/49897* (2015.01)

(58) Field of Classification Search
None
See application file for complete search history.

(56) References Cited

U.S. PATENT DOCUMENTS

| 6,374,004 B1 * | 4/2002 | Han | G02B 6/4206 385/14 |
| 6,757,308 B1 * | 6/2004 | Eldring | H01S 5/423 372/109 |
| 6,900,509 B2 * | 5/2005 | Gallup | G02B 6/4201 257/21 |

(Continued)

FOREIGN PATENT DOCUMENTS

| WO | 01/27676 | 4/2001 |
| WO | 2013/134326 | 9/2013 |

OTHER PUBLICATIONS

International Search Report of Counterpart PCT International Application No. PCT/US2015/032471.

*Primary Examiner* — Tina Wong
(74) *Attorney, Agent, or Firm* — Liu & Liu

(57) ABSTRACT

A vision-based passive alignment approach to optically couple input/output of optical fibers in optical alignment to optoelectronic components that are supported on a substrate. An optical bench supporting an optical fiber is physically and optically coupled to an optoelectronic device mounted on a submount via an optically transparent alignment block. The transparent alignment block having a first set of optical fiducials for aligning optical fiducials defined on the optical bench with the alignment block, and a second set of optical fiducials for aligning the alignment block with optical fiducials defined on the submount.

22 Claims, 6 Drawing Sheets

(56) References Cited

U.S. PATENT DOCUMENTS

| | | | | |
|---|---|---|---|---|
| 7,329,054 B1* | 2/2008 | Epitaux | ............... | G02B 6/4249 385/89 |
| 7,449,674 B2* | 11/2008 | Ueno | ............... | G02B 6/423 250/227.11 |
| 7,534,052 B2* | 5/2009 | Fujiwara | ............... | G02B 6/4214 385/49 |
| 8,200,056 B2* | 6/2012 | Baugh | ............... | G02B 6/4249 385/49 |
| 8,529,140 B2* | 9/2013 | McColloch | ............... | G02B 6/4204 385/88 |
| 8,934,745 B2* | 1/2015 | Mathai | ............... | G02B 6/4228 385/14 |
| 8,985,865 B2* | 3/2015 | Howard | ............... | G02B 6/3829 385/79 |
| 8,989,539 B2* | 3/2015 | Selli | ............... | G02B 6/4214 264/1.25 |
| 2002/0064347 A1* | 5/2002 | Mertz | ............... | G02B 6/4292 385/52 |
| 2006/0274997 A1 | 12/2006 | Furuno et al. | | |
| 2009/0310907 A1* | 12/2009 | Ikeda | ............... | B29C 65/4845 385/14 |
| 2011/0064358 A1* | 3/2011 | Nishimura | ............... | G02B 6/4214 385/33 |
| 2011/0091167 A1* | 4/2011 | Nishimura | ............... | G02B 6/4214 385/88 |
| 2011/0317959 A1* | 12/2011 | Ohta | ............... | G02B 6/4214 385/38 |
| 2012/0257860 A1* | 10/2012 | Li | ............... | G02B 6/3858 385/83 |
| 2013/0146120 A1* | 6/2013 | Seel | ............... | H01L 31/0524 136/246 |
| 2013/0294732 A1 | 11/2013 | Li et al. | | |
| 2016/0161686 A1* | 6/2016 | Li | | |

* cited by examiner

VISION-BASED PASSIVE ALIGNMENT OF AN OPTICAL FIBER SUBASSEMBLY TO AN OPTOELECTRONIC DEVICE

PRIORITY CLAIM

This application claims the priority of U.S. Provisional Patent Application No. 62/002,772 filed on May 23, 2014. This application is fully incorporated by reference as if fully set forth herein. All publications noted below are fully incorporated by reference as if fully set forth herein.

BACKGROUND OF THE INVENTION

1. Field of the Invention

The present invention relates to coupling of light into and out of optoelectronic devices (e.g., photonic integrated circuits (PICs)), and more particular to optical connections of optical fibers to optoelectronic devices supported on a circuit board.

2. Description of Related Art

Optoelectronic devices include optical and electronic components that source, detect and/or control light, converting between light signals and electrical signals. For example, a transceiver (Xcvr) is an optoelectronic module comprising both a transmitter (Tx) and a receiver (Rx) which are combined with circuitry within a housing. The transmitter includes a light source (e.g., a VCSEL or DFB laser), and the receiver includes a light sensor (e.g., a photodiode). Heretofore, a transceiver's circuitry is soldered onto a printed circuit board. Such a transceiver generally has a substrate that forms the bottom of a package (either hermetic or non-hermetic), and then optoelectronic devices such as lasers and photodiodes are soldered onto the substrate. Optical fibers are connected to the exterior of the package or fed through the wall of the package using a feedthrough (see, US20130294732A1, which had been commonly assigned to the Assignee/Applicant of the present application, and is fully incorporated as if fully set forth herein).

The cost of the transceiver can be reduced substantially if the package is eliminated, and some commercial transceivers are doing this. For instance, some active optical cable with a silicon photonic integrated circuit (SiPIC) successfully operate without a package. The SiPIC chip is enclosed in epoxy, which is also used to hold an optical fiber array. This approach does not provide a separable connector; the optical fibers are permanently attached to the SiPIC.

US Conec Ltd. introduced the model PRIZM LightTurn connector assembly that is designed as a detachable module-mounted connector. A bottom support is attached to the transceiver, and a connector carrying an optical fiber array is aligned to the support using two pin-in-hole connections. A top clip snaps in place and holds the connector against the support. This connector assembly is fabricated from polymer.

For proper operation, an optoelectronic device supported on a printed circuit board needs to efficiently couple light to an external optical fiber. Most optoelectronic devices (e.g., PICs) require single-mode optical connections that require stringent alignment tolerances between optical fibers and the devices, typically less than 1 micrometer. This is challenging since so many optical fibers are optically aligned to elements on the PICs using an active optical alignment approach in which the position and orientation of the optical fiber(s) is adjusted by machinery until the amount of light transferred between the fiber and PIC is maximized.

The current state of the art is expensive due to the inclusion of a package, excludes the use of common electronics and assembly processes, and/or often not suited to single-mode applications required by many PICs. Active optical alignment involves relatively complex, low throughput undertakings since the laser or photodiode must be energized during the active alignment process. Further, those components that are made of plastic (e.g., the PRIZM LightTurn connector by US Conec Ltd.) are not well suited to single-mode connections, and the plastic components should not be in place during any subsequent soldering processes that may cause the polymer construction to shift and compromise optical alignment.

What is needed is an improved approach to optically couple input/output of optical fibers in optical alignment to optoelectronic components that are supported on a substrate (e.g., a printed circuit board), which improves throughput, tolerance, manufacturability, ease of use, functionality and reliability at reduced costs.

SUMMARY OF THE INVENTION

The present invention overcomes the drawbacks of the prior art by providing a vision-based passive alignment approach that does not require energized circuitry or electro-optical components to optically couple input/output of optical fibers in optical alignment to optoelectronic components that are supported on a substrate, which improves throughput, tolerance, manufacturability, ease of use, functionality and reliability at reduced costs.

In one embodiment, an optical bench in the form of an optical fiber subassembly (OFSA) supporting at least one optical fiber is physically and optically coupled to an optoelectronic device (e.g., a VCSEL array, PD array, or photonic integrated circuits (PIC)) that is mounted on a substrate and/or printed circuit board (PCB). The novel passive optical alignment connection includes a support (e.g., a housing or a submount) supporting the optoelectronic device, and a transparent alignment block having a first set of optical fiducials for aligning optical fiducials defined on the OFSA with the alignment block, and a second set of optical fiducials for aligning the alignment block with optical fiducials defined on the support. The first and second sets of optical fiducials are precisely located with respect to each other on the alignment block. The input/output ends of the optical fibers supported by the OFSA are precisely positioned with respect to the optical fiducials on the OFSA. The optoelectronic device(s) are precisely located with respect to the optical fiducials on the support. Accordingly, upon assembly, the OFSA, the alignment block and support would be passively aligned by aligning the optical fiducials on the OFSA, the alignment block and the support, with the input/output end of the optical fiber optically aligned with the optoelectronic device on the support along a desired, predefined optical path.

The support may be initially attached to a substrate (e.g., a PCB) of a module, or alternatively the support may be mounted to the alignment block prior to attaching to the module substrate. Further, the OFSA may be removably attached to the alignment block, via a 'separable' or 'demountable' or 'detachable' action, in accordance with a novel connection created by the Assignee/Applicant of the present invention (see, U.S. patent application Ser. No. 14/714,240, which was filed on May 15, 2015).

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention overcomes the drawbacks of the prior art by providing a vision-based passive alignment approach to optically couple input/output of optical fibers in optical alignment to optoelectronic components that are attached on a substrate, which improves throughput, tolerance, manufacturability, ease of use, functionality and reliability at reduced costs.

The concept of the present invention will be discussed with reference to an optical fiber subassembly (OFSA) as an example of an optical bench that supports an input/output end of an optical fiber, and a transmitter (Tx) with an array of vertical-cavity surface-emitting lasers (VCSELs) as an example of an optoelectronic device, which could be part of a transceiver (Xcvr). Alternatively, the VCSEL array and submount could be embodied in a device that integrates the photonic circuitry into a single chip as a photonic integrated circuit (PIC). The present invention may be applied to provide passive alignment of other types of optical benches to other types of optoelectronic devices without departing from the scope and spirit of the present invention.

Figure 1:
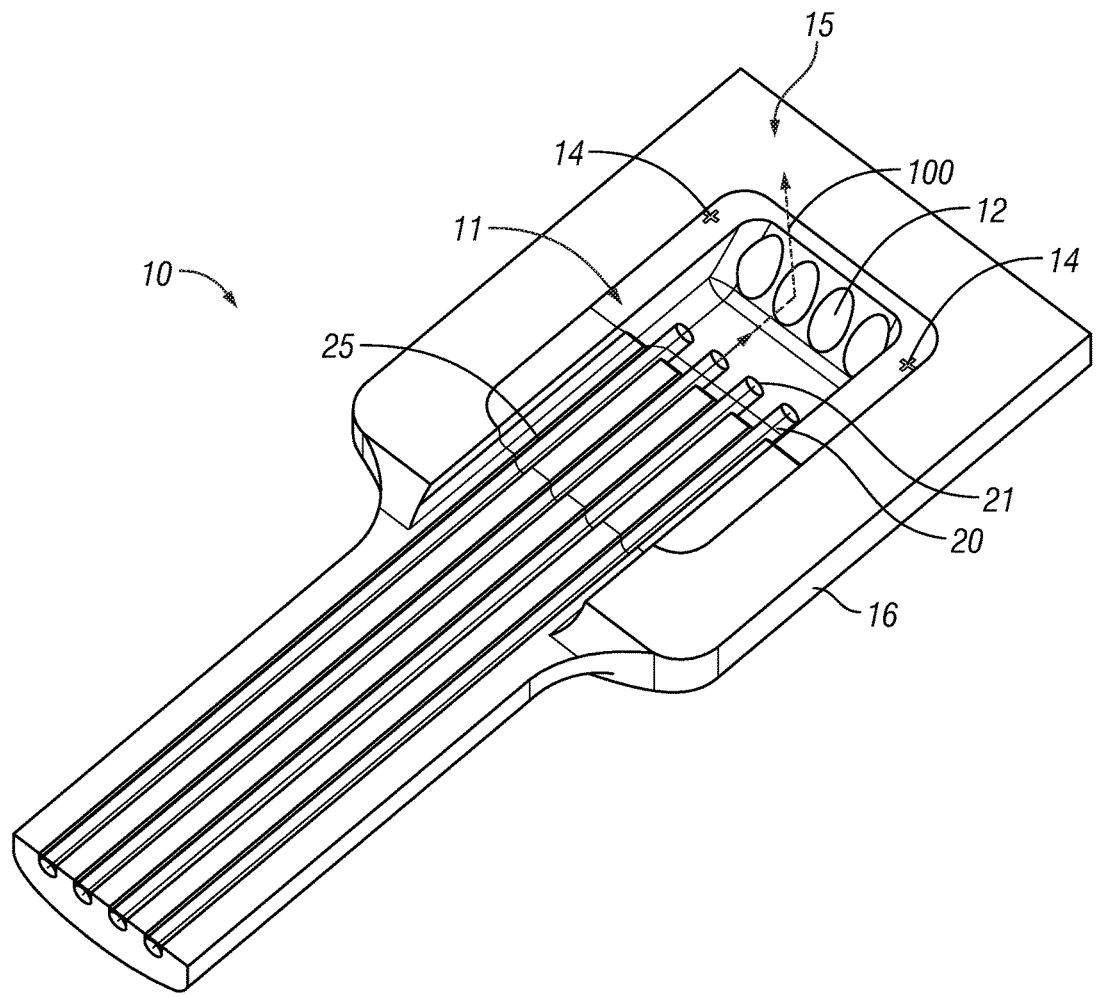
FIG. 1 is a perspective view of an optical bench that accurately locates optical fibers with respect to a mirror array, in accordance with one embodiment of the present invention.

FIG. 1 illustrates an OFSA 10 incorporating a micro optical bench 11 for supporting an optical component in the form of optical fibers 20 (e.g., four optical fibers 20 in short sections or stubs). The optical bench 11 includes a base 16, which defines structured features including an alignment structure comprising open grooves 25 for retaining bare sections of optical fibers 20 (having cladding exposed, without protective buffer and jacket layers), and structured reflective surfaces 12 (i.e., four reflectors) having a plane inclined at an angle relative to the greater plane of the base 16. Each structured reflective surface 12 may have a flat, concave or convex surface profile and/or possess optical characteristics corresponding to at least one of the following equivalent optical elements: mirror, focusing lens, diverging lens, diffraction grating, or a combination of the foregoing. The structured reflective surface 12 may have a compound profile defining more than one region corresponding to a different equivalent optical element (e.g., a central region that is focusing surrounded by an annular region that is diverging). In one embodiment, the structured reflective surfaces 12 may have a concave aspherical reflective surface profile, which serves both functions of reflecting and reshaping (e.g., collimating or focusing) a diverging incident light, without requiring a lens. Accordingly, referring also to FIGS. 9 and 10) each structured reflective surface 12 functions as an optical element that directs light to/from an external optical or optoelectronic component (in this case an optoelectronic device such as a VCSEL 2, by reflection from/to the output/input end 21 of the optical fiber 20, along a defined optical path 100 that is aligned to the optical axis of the various optical components and elements (i.e., optical fibers 20, structured reflective surfaces 12, and VCSEL 2).

The open grooves 25 are sized to receive and located to precisely position the end section of the optical fibers 20 in alignment with respect to the structured reflective surfaces 12 along the optical path 100. The end face 21 (input/output end) of each of the optical fibers 20 is maintained at a pre-defined distance with respect to a corresponding structured reflective surface 12.

The overall functional structures of the optical bench 11 generally resemble the structures of some of the optical bench embodiments disclosed in nanoPrecision's earlier patent documents noted below (i.e., the fiber alignment grooves aligned with structured reflective surfaces, and addition features to facilitate proper optical alignment). In the present invention, however, the optical bench 11 is stamped with passive alignment features, in the form of optical fiducials. In the view of FIG. 1, optical fiducials 14 are formed on the planar surface 15 of the base 16, which facilitates alignment and/or accurate positioning the optical bench 11 with respect to the VCSEL 2, as will be further explained below. The input/output ends 21 of the optical fibers 20/the grooves 25 (which define the locations of optical fiber ends 21) and the structured reflective surfaces 21 are precisely positioned with respect to the optical fiducials 14 on the optical bench 11.

In a further aspect of the present invention, the mirror/ structured reflective surface and optical fiber alignment structure in the optical connector can be integrally/simultaneous formed by precision stamping of a stock material (e.g., a metal blank or strip), which allows the connector components to be produced economically in high or small volumes, while improving tolerance, manufacturability, ease of use, functionality and reliability. By forming the structured reflective surface, the passive alignment features (i.e., the optical fiducials 14) and the optical fiber alignment structure simultaneously in the same, final stamping operation, dimensional relationship of all features requiring alignment on the optical bench can be maintained in the final stamping step. Instead of a punching operation with a single strike of the punch to form all the features on the optical bench, it is conceivable that multiple strikes may be implemented to progressive pre-form certain features on the optical bench, with a final strike to simultaneously define the final dimensions, geometries and/or finishes of the various structured features on the optical bench, including the mirror, optical fiber alignment structure/groove, passive alignment features, etc. that are required to ensure (or play significant role in ensuring) proper alignment of the respective components/structures along the design optical path.

The Assignee of the present invention, nanoPrecision Products, Inc., developed various proprietary optical coupling/connection devices having optical benches used in connection with optical data transmission. The present invention is more specifically directed to detachably/reconnectably coupling optical fibers to photonic components including PICs, while adopting similar concept of stamping optical benches including stamped mirrors practiced in the earlier optical coupling devices.

For example, US2013/0322818A1 discloses an optical coupling device having a stamped structured surface for routing optical data signals, in particular an optical coupling device for routing optical signals, including a base; a structured surface defined on the base, wherein the structured surface has a surface profile that reshapes and/or reflect an incident light; and an alignment structure defined on the base, configured with a surface feature to facilitate positioning an optical component on the base in optical alignment with the structured surface to allow light to be transmitted along a defined path between the structured surface and the optical component, wherein the structured surface and the alignment structure are integrally defined on the base by stamping a malleable material of the base.

US2013/0294732A1 further discloses a hermetic optical fiber alignment assembly having an integrated optical element, in particular a hermetic optical fiber alignment assembly including a ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping.

U.S. patent application Ser. No. 14/695,008 further discloses an optical coupling device for routing optical signals for use in an optical communications module, in particular an optical coupling device in which defined on a base are a structured surface having a surface profile that reshapes and/or reflect an incident light, and an alignment structure defined on the base, configured with a surface feature to facilitate positioning an optical component on the base in optical alignment with the structured surface to allow light to be transmitted along a defined path between the structured surface and the optical component. The structured surface and the alignment structure are integrally defined on the base by stamping a malleable material of the base. The alignment structure facilitates passive alignment of the optical component on the base in optical alignment with the structured surface to allow light to be transmitted along a defined path between the structured surface and the optical component. The structured surface has a reflective surface profile, which reflects and/or reshape incident light.

U.S. Pat. No. 7,343,770 discloses a novel precision stamping system for manufacturing small tolerance parts. Such inventive stamping system can be implemented in various stamping processes to produce the devices disclosed in above-noted nanoPrecision patent documents, and can similarly be implemented to produce the structures disclosed herein (including the structures for the optical bench 11 discussed above. These stamping processes involve stamping a bulk material (e.g., a metal blank or stock), to form the final surface features at tight (i.e., small) tolerances, including the reflective surfaces having a desired geometry in precise alignment with the other defined surface features.

Essentially, for the OFSA 10, the base 16 defines an optical bench 11 for aligning the optical fibers 20 with respect to the structured reflective surfaces 12. By including the grooves 25 on the same, single structure that also defines the structured reflective surfaces 12, the alignment of the end sections 21 of the optical fibers 20 to the structured reflective surfaces 12 can be more precisely achieved with relatively tighter (smaller) tolerances by a single final stamping operation to simultaneous define the final structure on a single part, as compared to trying to achieve similar alignment based on features defined on separate parts or structures. By forming the structured reflective surfaces 12 and the optical fiber alignment structure/grooves 25 simultaneously in a same, single final stamping operation, dimensional relationship of all features/components requiring (or play a role in providing) alignment on the same work piece/part can be maintained in the final stamping step.

Figure 2:
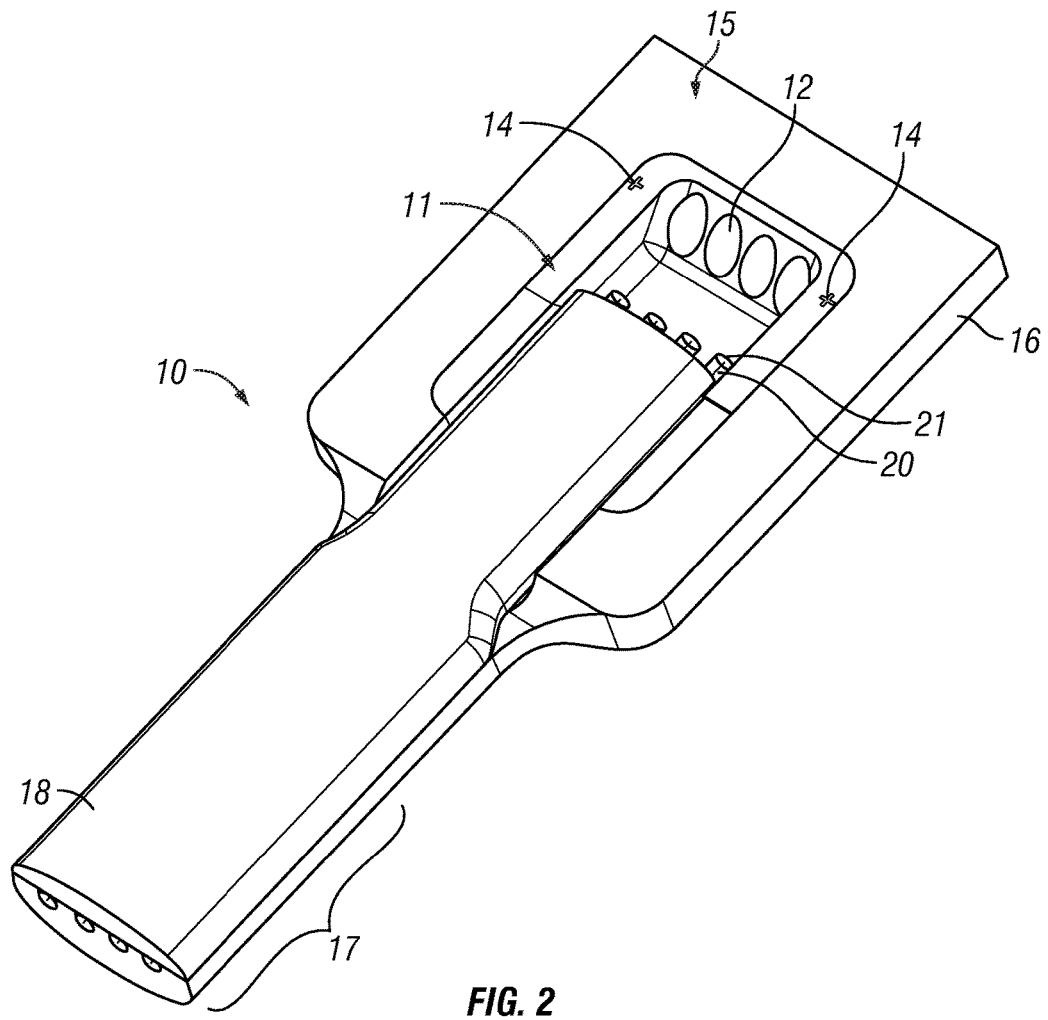
FIG. 2 is a perspective view of the optical bench with a cover that completes a ferrule, in accordance with one embodiment of the present invention.

Referring to FIG. 2, the OFSA 10 further includes a cover 18 that covers the exposed grooves 25 and the sections of optic fibers 20. The terminating section 17 of the overall structure of the combination of the cover 18 and the optical bench 11 essentially forms a ferrule, to which a ferrule 51 supporting a terminating end of an optical fiber cable 23 may be coupled via a sleeve 50 (see, FIG. 8).

Figure 5:
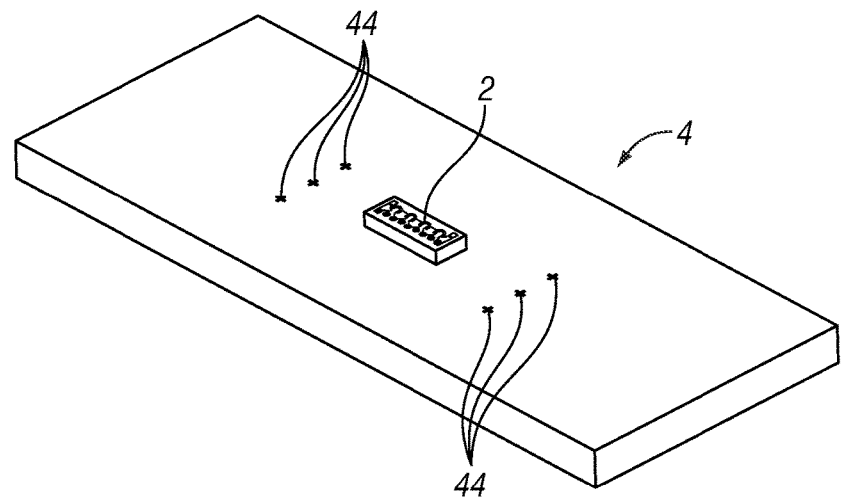
FIG. 5 is a perspective view of a VCSEL array placed on a submount in accurate alignment with optical fiducials on the submount, in accordance with one embodiment of the present invention.

In one embodiment, the novel passive optical alignment connection includes a submount supporting the optoelectronic device (e.g., the VCSEL 2). Referring to FIG. 5, the VCSEL 2 is mounted on a submount 4, which is defined with a set of optical fiducials 44. These fiducials may be produced on the submount using lithographic procedures that hold nano-scale tolerances on the placement of the fiducials. The VCSEL 2 is precisely positioned with respect to the optical fiducials 44 on the submount 4 (i.e., the mounting location of the VCSEL 2 on the submount 4 is precisely determined by reference to the optical fiducials 44), by using known pick-and-place machines with visual feedback that align lithographically patterned features on the surface of the VCSEL (e.g. emitting area, solder pads, etc.) to the lithographically patterned fiducials 44 on the submount 4. While FIG. 5 illustrates the photonic component as a VCSEL 2 that is mounted on a separate submount 4, in an alternate embodiment, the submount may be an integral part of the photonic component, and this arrangement removes the assembly of the photonic component onto the submount. For example, the fiducials 44 may be lithographically patterned onto the surface of a photonic integrated circuit (PIC) that also includes a light source such as a diffractive grating coupler. For other types of integrated optoelectronic devices such as a silicon photonic integrated circuit (SiPIC), the housing of the SiPIC may function as a submount (e.g., the silicon substrate/housing of the SiPIC) on which optical fiducials are defined (e.g., by lithographic/etching processes).

Figure 3:
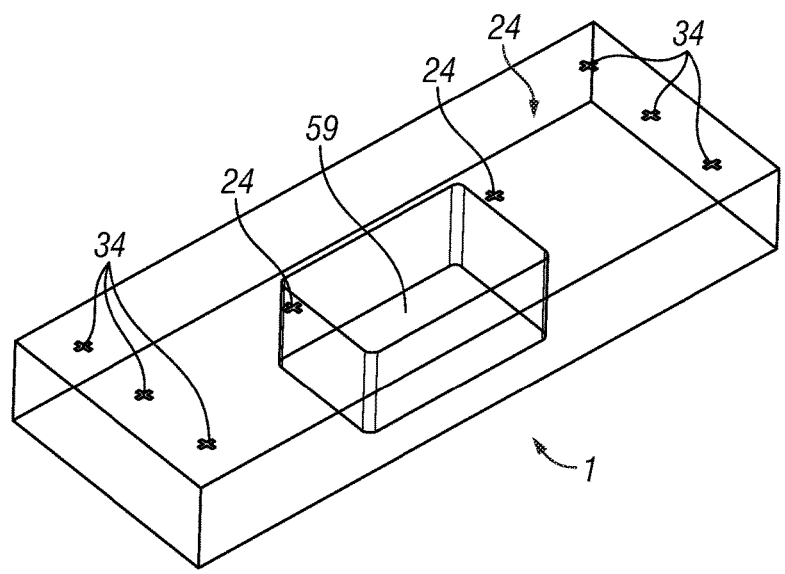
FIG. 3 is perspective view of an optically transparent alignment block with optical alignment fiducials, in accordance with one embodiment of the present invention.

Referring to FIG. 3, the novel alignment connection further includes an optically transparent alignment block 1 having a first set of optical fiducials 24 for aligning the optical fiducials 14 defined on the optical bench 11 of the OFSA 10 with the alignment block 1, and a second set of optical fiducials 34 for aligning the alignment block 1 with the optical fiducials 44 defined on the submount 4. The first and second sets of optical fiducials 24 and 34 are precisely located with respect to each other on the alignment block 1. The optical fiducials 24 and 34 may be defined on the same surface (e.g., top surface 29) of the alignment block 1, using lithographic processes with better than 1 micrometer accuracy. Alternatively, the two sets of optical fiducials may be defined on opposing surfaces of the alignment block 1. The alignment block 1 may be made of a suitable optically transparent material, such as glass, quartz or hard plastic.

Figure 4:
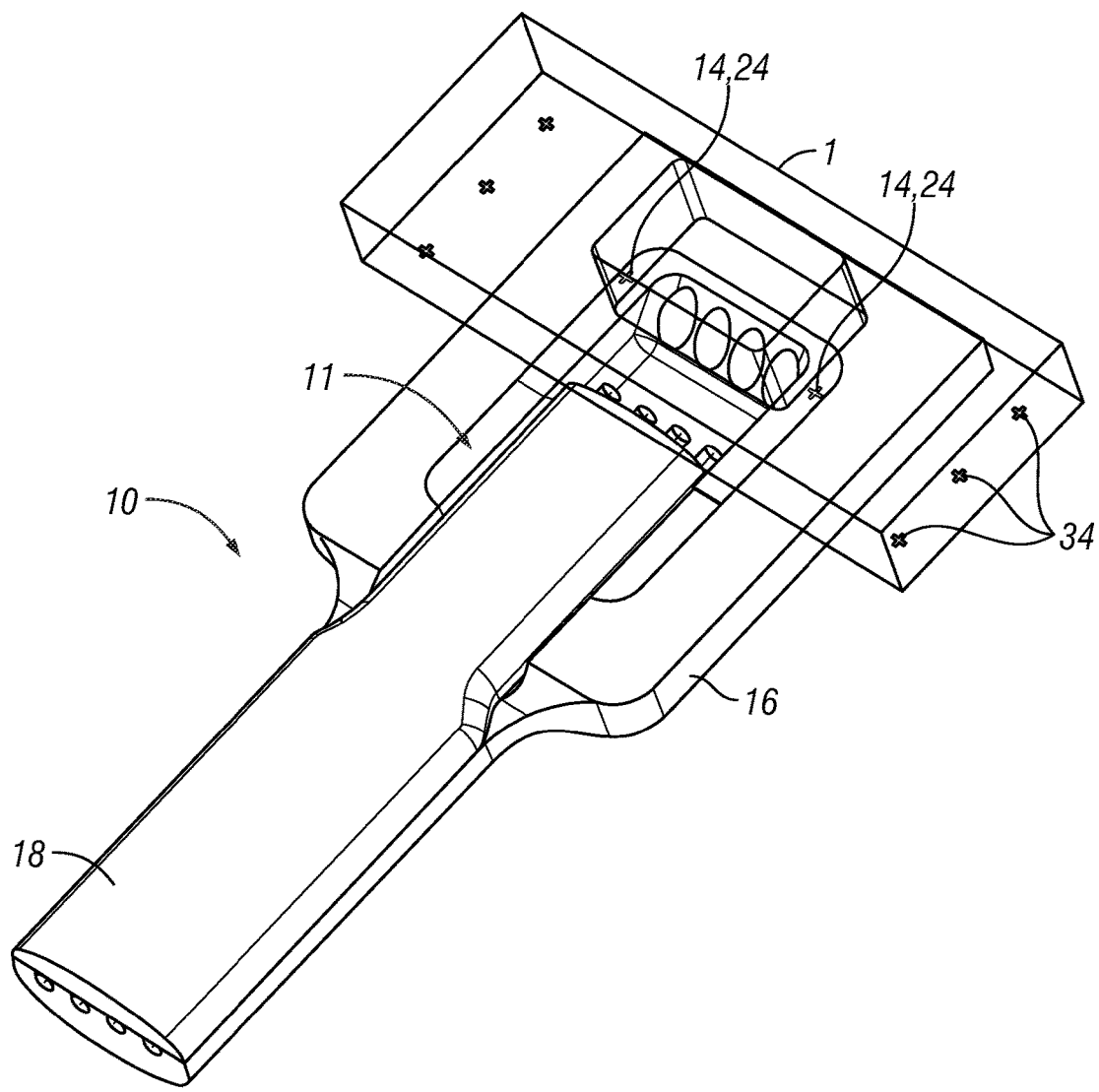
FIG. 4 is a perspective view illustrating the attachment of the optical bench in alignment with the alignment block.
Figure 9:
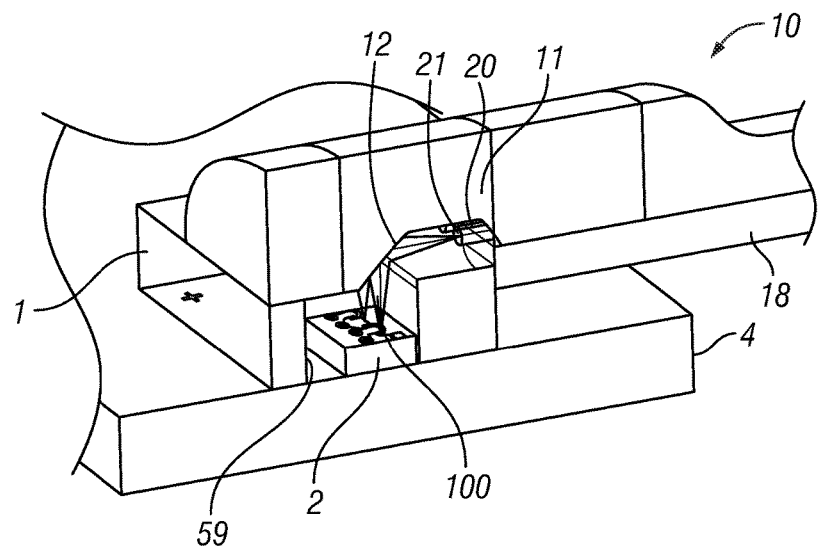
FIG. 9 is a sectional view taken along line 9-9 in FIG. 7.
Figure 10:
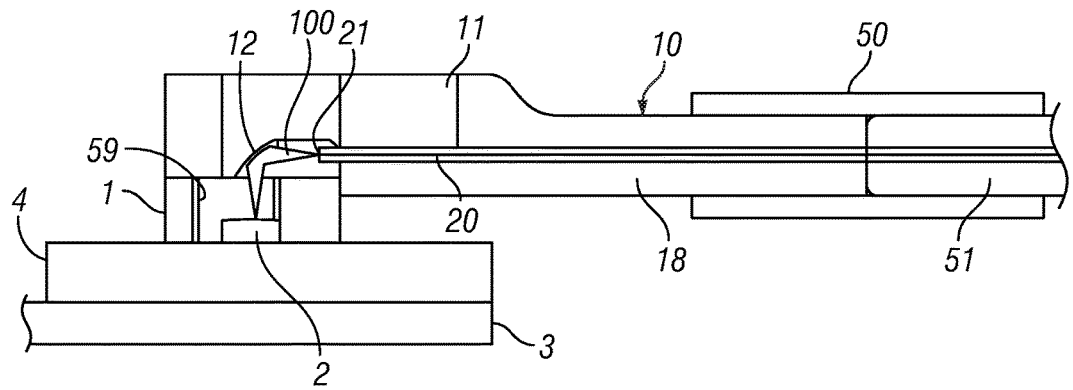
FIG. 10 is a sectional view taken along line 10-10 in FIG. 8.

In the illustrated embodiment, an opening 59 is provided in the alignment block 1, which provides clearance to allow passage of light between the structured reflective surfaces 12 on the optical bench 11 and the VCSEL 2 (see also FIGS. 4 and 9 and 10). The opening 59 could be in the form of a through-hole as shown in the embodiment of FIG. 3, or in the form of a cutout (i.e., the alignment block having a U-shaped body). Alternatively, the opening may be omitted, if the optical bench 11 can be attached to the alignment block with the structured reflective surfaces 12 passing light beyond the edge of the alignment block. Alternatively, the alignment block may not have any hole and the light to/from the structured reflective surfaces 12 is directed to pass through the transparent alignment block.

Referring to FIG. 4, the OFSA 10/optical bench 11 is attached to the alignment block 1 (e.g., via soldering or adhesive), with the optical fiducials 14 on the optical bench 11 aligned with the first set of optical fiducials 24 on the alignment block 1. Given the optical fiducials 14 and 24 are visible through the transparent alignment block 1, the alignment of the optical fiducials 14 and 24 can be passively determined/confirmed visually/optically. For example, the first set of optical fiducials 24 on the optically transparent body of the alignment block 1 can be aligned to the optical bench fiducials 14 using known pick-and-place machinery that uses vision-based alignment schemes.

Figure 6:
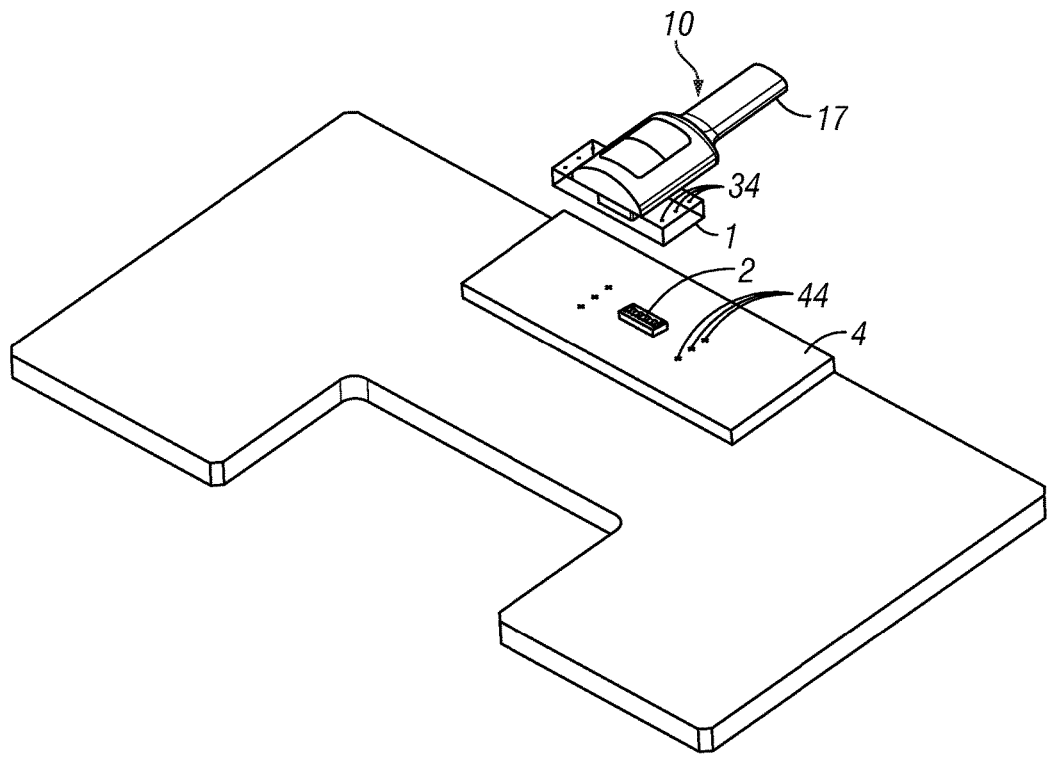
FIG. 6 is a perspective view illustrating attachment of the alignment block with optical bench onto the submount, in accordance with one embodiment of the present invention.

Referring to FIG. 6, the alignment block 1 with the OFSA 10 attached thereto is attached to the submount 4 (e.g., via adhesive), with the second set of optical fiducials 34 on the alignment block 1 aligned with the optical fiducials 44 defined on the submount 4. Given the optical fiducials 34 and 44 are visible through the transparent alignment block 1, the alignment of the optical fiducials 34 and 44 can be passively determined/confirmed visually/optically. For example, the second set of optical fiducials 34 on the optically transparent body of the alignment block 1 can be aligned to the submount fiducials 44 using known vision-based alignment machinery.

Figure 7:
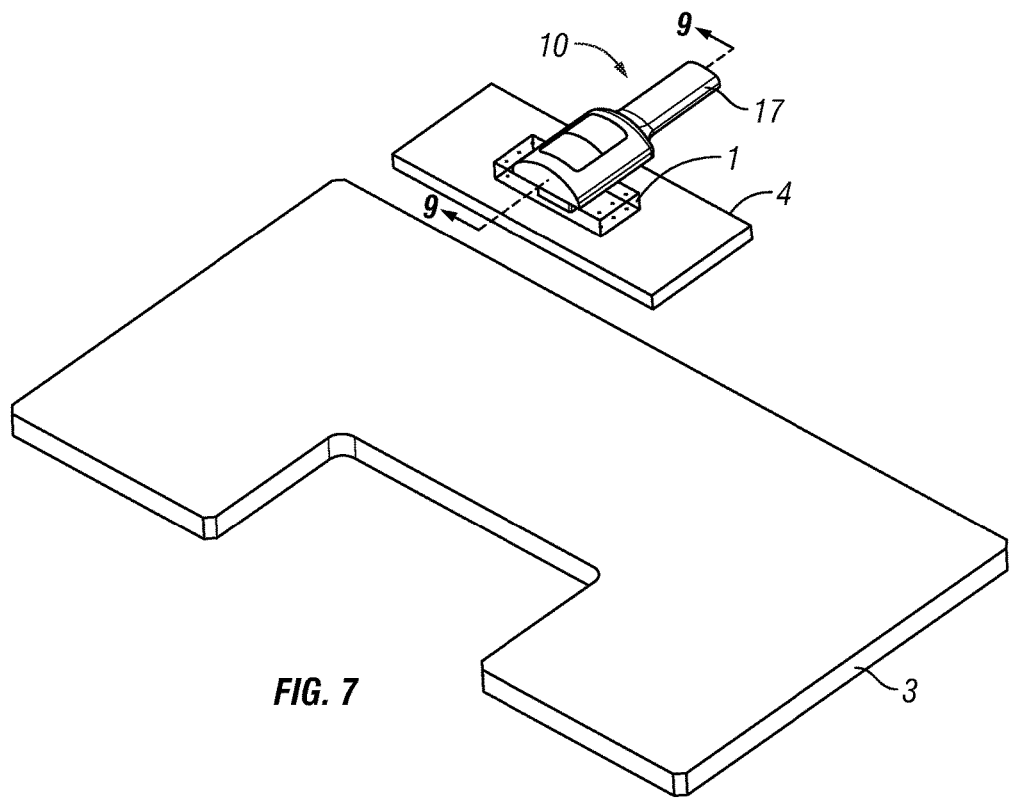
FIG. 7 is a perspective view illustrating attachment of the submount with alignment block and optical bench onto a printed circuit board, in accordance with one embodiment of the present invention.

In the embodiment of FIG. 6, the submount 4 is pre-attached to an underlying substrate, e.g., a PCB 3, which may be part of a substrate or housing of an optoelectronic device module, prior to attaching the alignment block 1 to the submount 4. Alternatively, in the embodiment of FIG. 7, the alignment block 1 is attached to the submount 4 prior to attaching the submount 4 to an underlying substrate (e.g., a PCB 3 or a silicon interposer).

The foregoing outlined process provides an optical fiber subassembly that is permanently attached to the board/submount/substrate. Upon assembly, the OFSA 10/optical bench 11, the alignment block 1 and submount 4 would be passively aligned with alignment of the optical fiducials on the OFSA 10/optical bench 11, the alignment block 1 and the submount 4, with the input/output ends 21 of the optical fibers 20 optically aligned along a desired, predefined optical path 100 with the optoelectronic device (e.g., VCSEL 2) supported on the submount 4. Referring to FIGS. 9 and 10, the optical alignment of the input/output ends 21 of the optical fibers 20 to the VCSEL 2 is illustrated. FIG. 9 is a sectional view taken along line 9-9 in FIG. 7, prior to attachment of the alignment block 1 to the PCB 3. FIG. 10 is a sectional view taken along line 10-10 in FIG. 8, after attachment of the alignment block 1 to the PCB 3. Given (a) the accurate positioning of the optical fiber ends 21 relative to the structured reflective surfaces 12 defined on the optical bench 11, (b) the alignment of the optical bench 11 of the OFSA 10 to the alignment block 1 via optical fiducials 14 and 24 discussed above, (c) the alignment of the alignment block 1 to the submount 4 that supports the VCSEL 2 via optical fiducials 34 and 44, and (d) the VCSEL 2 is precisely located with respect to the optical fiducials on the submount 4, the overall structure shown in FIGS. 9 and 10 results in a precise optical alignment along a desired predefined optical path 100, which is defined between the ends 21 of the optical fibers 20 and the VCSEL 2 via the structured reflective surfaces 12 defined on the optical bench 11.

In the embodiment of FIGS. 9 and 10, the light path 100 is turned substantially 90 degrees by the structured reflective surfaces 12. As illustrated, the optical bench 11/OFSA 10 provides a convenient, compact connection structure (i.e., a, optical connector) that allows the optical fiber cable to be coupled to the optoelectronic device (e.g., VCSEL 2) with the optical fibers aligned substantially parallel to the major plane (e.g., plane of the supporting substrate or submount) of the optoelectronic device.

Figure 8:
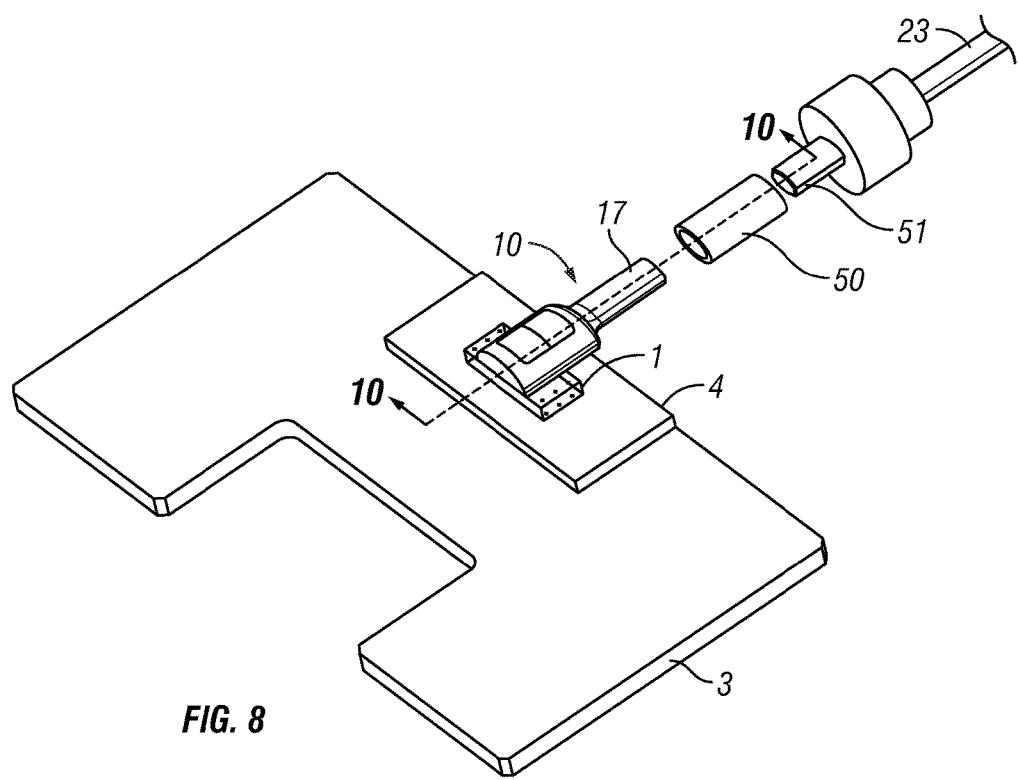
FIG. 8 is a perspective view illustrating attachment of an optical fiber jumper, using a separable fiber-optic connector, to the optical bench that has been aligned to the VCSEL, in accordance with one embodiment of the present invention.

Referring back to the embodiment of FIG. 8, it can be appreciated that the present invention provides a board-mounted optical fiber subassembly (BM-OFSA) 10 that can be permanently attached to the substrate/submount/board 4 of an optoelectronic device such as a transceiver including a VCSEL 2. The BM-OFSA 10 is aligned via optical fiducials (14, 24, 34 and 44) and attached to the substrate/submount/board 4 with an attachment process like soldering or an adhesive like epoxy. The BM-OFSA 10 includes a stamped connector formed of a stamped micro optical bench 11 that also forms a ferrule 17 for a separable fiber connection. The stamped connector is a clam-shell design containing an array of optical fiber stubs 20. One end of the fiber stub is terminated in a ferrule 17 (e.g. having a generally oval cross-section) and the opposite end 21 is terminated at an array of micro mirrors 12, preferably manufactured by stamping. The mirrors fold the light beams and focus them onto electro-optical chips on the board/substrate/submount 4. This ferrule end 17 is integral to the micro optical bench. The ferrule end 17 provides a separable connection interface to a ferrule 51 of a fiber jumper 23 via an alignment sleeve 50.

The present invention provides a method for assembly the BM-OFSA 10 to the board/submount/substrate 4 using vision-based passive alignment, which is readily available in pick-and-place machinery with about a 1 micrometer positioning accuracy. This is adequate for single-mode optical connections. The invention is compatible with conventional electronics assembly processes like wave soldering since it is made of metal and glass which can tolerate high-temperature processes. The BM-OFSA can be attached to a circuit board by passive alignment in accordance with the present invention, and after the board is completely populated, the optical fiber cables can be connected using the ferrule end of the BM-OFSA. Consequently the optical fiber cables are not in the way during the assembly of the circuit board.

In an alternate embodiment, instead of a built-in integral ferrule at one end of the micro optical bench, a separate, independent ferrule may be joined to one end of the micro optical bench.

In a further embodiment, instead of configuring the optical bench 11 with a ferrule 17 as a short stub to provide for a separable connection to a fiber jumper 23 in the configuration illustrated in FIG. 8, an optical fiber cable may be permanently attached to the optical bench 11 (i.e., the ends 21 of the optical fibers 20 in the optical fiber cable are supported in alignment by the optical bench 11). This configuration eliminates the sleeve 50 and the ferrule 51 shown in FIG. 8. The ends 21 of the optical fibers 20 of the optical fiber cable 23 are inserted directly into the grooves 25 in the optical bench 11. In this embodiment, the optical bench 11 also serves as a ferrule for supporting the optical fibers in optical alignment within the passively aligned optical/mechanically coupling.

It is noted that the OFSA may be removably attached to the alignment block, via a 'separable' or 'demountable' or 'detachable' action, in accordance with a novel connection created by the Assignee/Applicant of the present invention (see, U.S. patent application Ser. No. 14/714,240, which was filed on May 15, 2015). As noted earlier, it is well within the scope and spirit of the present invention to adopt the inventive concept to other types of optoelectronic devises (e.g., a PIC), and other types of optical benches and optical subassemblies.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A passive alignment connection structure between an optical bench and an optoelectronic device, comprising:
   an optically transparent alignment block having a first set of optical fiducials and a second set of optical fiducials defined thereon;
   an optical bench having a body defined with alignment features including optical fiducials, wherein the optical bench is attached to the alignment block with the optical fiducials defined on the optical bench aligned with the first set of optical fiducials defined on the alignment block;
   a support which supports the optoelectronic device, wherein optical fiducials are defined on the support, wherein the support is attached to the alignment block with the optical fiducials of the support aligned with the second set of optical fiducials defined on the alignment block,
   wherein the optical bench optical is aligned with the alignment block by optically aligning the first set of optical fiducials with the optical fiducials defined on the optical bench without relying on a physical alignment structure, and wherein the support is aligned with the alignment block with the optical fiducials defined on the support optically aligned with the second set of optical fiducials defined on the alignment block without relying on a physical alignment structure.

2. The passive alignment connection structure of claim 1, wherein the body of the optical bench is formed by stamping, including stamping the alignment features including the optical fiducials of the optical bench.

3. The passive alignment connection structure of claim 1, wherein the support comprises a submount on which the fiducials of the support are defined, and the optoelectronic device is mounted on the submount in relation to said fiducials.

4. The passive alignment connection structure of claim 1, wherein the optical bench comprises at least a structured reflective surface and the alignment features comprises an alignment structure that supports an optical fiber in optical alignment with the structured reflective surface, wherein an optical path is defined between the optical fiber and the optoelectronic device via the structured reflective surface, and wherein the optical bench is aligned with the optoelectronic device to maintain the optical path.

5. The passive alignment connection structure of claim 4, wherein the optoelectronic device comprises at least one of a transmitter, a receiver, a transceiver, and a photonic integrated circuit.

6. The passive alignment connection structure of claim 4, wherein the alignment block comprises an opening for passage of light between the structured reflective surface defined on the optical bench and the optoelectronic device.

7. The connection structure of claim 3, wherein the submount is an integral part of the optoelectronic device.

8. A method for providing a passive alignment connection between an optical bench and an optoelectronic device, comprising:
   providing an optically transparent alignment block having a first set of optical fiducials and a second set of optical fiducials defined thereon;
   defining alignment features on a body of the optical bench, including optical fiducials;
   attaching the optical bench to the alignment block with the optical fiducials defined on the optical bench aligned with the first set of optical fiducials defined on the alignment block;
   defining optical fiducials on a support on which the optoelectronic device is supported, wherein the support is attached to the alignment block with the optical fiducials of the support aligned with the second set of optical fiducials defined on the alignment block,
   wherein the optical bench optical is aligned with the alignment block by optically aligning the first set of optical fiducials with the optical fiducials defined on the optical bench without relying on a physical alignment structure, and wherein the support is aligned with the alignment block with the optical fiducials defined on the support optically aligned with the second set of optical fiducials defined on the alignment block without relying on a physical alignment structure.

9. The method of claim 8, wherein the body of the optical bench is formed by stamping, including stamping the alignment features including the optical fiducials of the optical bench.

10. The method of claim 8, wherein the support comprises a submount on which the fiducials of the support are defined, and the optoelectronic device is mounted on the submount in relation to said fiducials.

11. The method of claim 8, wherein the optical bench comprises a structured reflective surface and defining alignment features comprises defining an alignment structure that supports an optical fiber in optical alignment with the structured reflective surface, wherein an optical path is defined between the optical fiber and the optoelectronic device via the structured reflective surface, and wherein the optical bench is aligned with the optoelectronic device to maintain the optical path.

12. The method of claim 11, wherein the optoelectronic device comprises at least one of a transmitter, a receiver, a transceiver, and a photonic integrated circuit.

13. The method of claim 11, wherein the alignment block comprises an opening for passage of light between the structured reflective surface defined on the optical bench and the optoelectronic device.

14. The method of claim 10, wherein the submount is an integral part of the optoelectronic device.

15. The passive alignment connection structure of claim 1, wherein the first set of optical fiducials is not optically aligned with the optical fiducials defined on the support, and the second set of optical fiducials is not optically aligned with the optical fiducials defined on the optical bench.

16. The method of claim 8, wherein the first set of optical fiducials is not optically aligned with the optical fiducials defined on the support, and the second set of optical fiducials is not optically aligned with the optical fiducials defined on the optical bench.

17. A passive alignment connection structure between an optical bench and an optoelectronic device, comprising:
   an optically transparent alignment block having a first set of optical fiducials and a second set of optical fiducials defined thereon;
   an optical bench having a body defined with alignment features including optical fiducials, wherein the optical bench is attached to the alignment block with the optical fiducials defined on the optical bench aligned with the first set of optical fiducials defined on the alignment block;
   a support which supports the optoelectronic device, wherein optical fiducials are defined on the support, wherein the support is attached to the alignment block with the optical fiducials of the support aligned with the second set of optical fiducials defined on the alignment block,
   wherein the optical bench comprises at least a structured reflective surface, and the alignment features comprises an alignment structure that supports an optical fiber in optical alignment with the structured reflective surface, wherein an optical path is defined between the optical fiber and the optoelectronic device via the structured reflective surface, and wherein the optical bench is aligned with the optoelectronic device to maintain the optical path.

18. The passive alignment connection structure of claim 17, wherein the alignment block comprises an opening for passage of light between the structured reflective surface defined on the optical bench and the optoelectronic device.

19. The passive alignment connection structure of claim 17, wherein the body of the optical bench is formed by stamping, including stamping the structured reflective surface and the alignment features including the optical fiducials of the optical bench.

20. A method of providing a passive alignment connection between an optical bench and an optoelectronic device, comprising:
   providing an optically transparent alignment block having a first set of optical fiducials and a second set of optical fiducials defined thereon;
   defining alignment features on a body of the optical bench, including optical fiducials;
   attaching the optical bench to the alignment block with the optical fiducials defined on the optical bench aligned with the first set of optical fiducials defined on the alignment block;
   defining optical fiducials on a support on which the optoelectronic device is supported, wherein the support is attached to the alignment block with the optical fiducials of the support aligned with the second set of optical fiducials defined on the alignment block,
   wherein the optical bench comprises a structured reflective surface, and defining alignment features comprises defining an alignment structure that supports an optical fiber in optical alignment with the structured reflective surface, wherein an optical path is defined between the optical fiber and the optoelectronic device via the structured reflective surface, and wherein the optical bench is aligned with the optoelectronic device to maintain the optical path.

21. The method of claim 20, wherein the alignment block comprises an opening for passage of light between the structured reflective surface defined on the optical bench and the optoelectronic device.

22. The method of claim 20, wherein the body of the optical bench is formed by stamping, including stamping the structured reflective surface and the alignment features including the optical fiducials of the optical bench.

* * * * *